United States Patent [19]

Ionescu

[11] Patent Number: 5,500,575
[45] Date of Patent: Mar. 19, 1996

[54] SWITCHMODE AC POWER CONTROLLER

[75] Inventor: Adrian Ionescu, Patchogue, N.Y.

[73] Assignee: Lighting Control, Inc., Aston, Pa.

[21] Appl. No.: 143,338

[22] Filed: Oct. 27, 1993

[51] Int. Cl.⁶ .................................................. G05F 1/00
[52] U.S. Cl. .................... 315/307; 315/308; 315/311; 315/314; 315/DIG. 7; 315/DIG. 4
[58] Field of Search ............................ 315/307, 308, 315/311, 223, 226, 247, DIG. 2, DIG. 4, DIG. 7, 314, 283, 356, 258

[56] References Cited

U.S. PATENT DOCUMENTS

| | | | |
|---|---|---|---|
| 3,335,318 | 8/1967 | Yancey | 315/194 |
| 3,430,101 | 2/1969 | Biltz | 315/194 |
| 3,573,543 | 4/1971 | Gridstaff | 315/194 |
| 3,763,396 | 10/1973 | Shilling | 315/307 |
| 4,024,451 | 5/1977 | Nishino et al. | 321/2 |
| 4,060,752 | 11/1977 | Walker | 315/307 X |
| 4,210,956 | 7/1980 | Watanabe | 363/51 |
| 4,328,454 | 5/1982 | Okuyama et al. | 318/803 |
| 4,335,318 | 6/1982 | Mabuchi et al. | 290/31 |
| 4,478,468 | 10/1984 | Schoen et al. | 315/291 |
| 4,511,195 | 4/1985 | Barter | 315/308 |
| 4,633,161 | 12/1986 | Callahan et al. | 323/242 |
| 4,642,525 | 2/1987 | Widmayer | 315/219 |
| 4,689,547 | 8/1987 | Rowen et al. | 323/239 |
| 4,700,113 | 10/1987 | Stupp et al. | 315/224 |
| 4,816,985 | 3/1989 | Tanahashi | 363/81 |
| 4,827,151 | 5/1989 | Okado | 307/66 |
| 4,843,246 | 6/1989 | Benes et al. | 250/491.1 |
| 4,933,606 | 6/1990 | Tary | 315/244 |
| 4,937,505 | 6/1990 | Deglon et al. | 315/207 |
| 4,942,511 | 7/1990 | Lipe et al. | 363/136 |
| 4,954,768 | 9/1990 | Luchaco et al. | 323/300 |
| 4,965,509 | 10/1990 | Oldham | 323/300 |
| 5,018,058 | 5/1991 | Ionescu et al. | 363/34 |
| 5,038,081 | 8/1991 | Maiale, Jr. et al. | 315/291 |
| 5,075,602 | 12/1991 | Overgoor et al. | 315/307 |
| 5,187,414 | 2/1993 | Fellows et al. | 315/307 |
| 5,225,741 | 7/1993 | Auld, Jr. et al. | 315/307 |
| 5,363,020 | 11/1994 | Chen et al. | 315/DIG. 7 X |

*Primary Examiner*—Robert J. Pascal
*Assistant Examiner*—Haissa Philogene
*Attorney, Agent, or Firm*—Mitchell A. Stein; Felfe & Lynch

[57] ABSTRACT

A switchmode AC power controller for controlling the current through a load such as a large lamp array connected to an alternating current source. The controller contains an AC solid state switch, a synchro-flywheel, an output inductor and capacitor. The load current is controlled by triggering signals generated by a synchronized modulator.

13 Claims, 5 Drawing Sheets

SWITCHMODE AC POWER CONTROLLER

This invention relates to AC power controllers, and more particularly concerns such controllers for varying the alternating electromotive force ("voltage") output applied to a load while maintaining the sinusoidal A.C. wave-form of the output voltage. The invention finds its primary application in the control of the intensity of a lamp in light dimming applications.

BACKGROUND OF THE INVENTION

The light dimming function has been implemented in a variety of ways. Several of these implementations of dimming techniques provide a variable sinusoidal output voltage. The advantage of providing a variable sinusoidal output voltage is a lower noise level during operation, and this applies to both electrical and mechanical noise. The electrical noise in this sense refers mainly to signals back-propagated into the AC power supply that distort its almost pure sinusoidal wave-form.

One power control method that preserves the sinusoidal wave-form is to provide a high power variable resistor to control the current through a lamp and hence the intensity of the lamp. This method can be used in both direct current and alternating current electric networks. The resistor, however, dissipates large amounts of power as heat, resulting in a low overall efficiency.

Another method uses a manual or motor driven variable voltage transformer to deliver a controllable voltage to a lamp. Although the efficiency of this method is relatively high, the size, weight and cost of the equipment makes this method quite unsuitable for light dimming applications, especially when more than one variable voltage transformer has to be synchronized for parallel control of a number of lamps. Further, the cost of the motor controlling circuitry and the overall slow response when fast changing lamp intensity is required constitute additional disadvantages. The variable voltage transformer, like any other mechanical device, is subject to mechanical wear. An additional cost is incurred for an external fuse or circuit breaker to protect the internal winding from self destruction during an output overload or short-circuit.

A still further example of a method for controlling the intensity of a lamp is a multiple tap transformer. This has been used to provide output voltages in a number of increments equal to the number of taps. This method is similar to the variable voltage transformer method described above, and suffers from the same limitations.

In still another method, variations of the generic D class amplifier electronic power circuit has been used to synthesize a variable output sinusoidal voltage. U.S. Pat. No. 5,018,058 issued to Ionescu et al, describes a dual conversion high frequency switching AC controller. After the first conversion, two 60 Hz modulated unipolar variable voltage sources provide the voltages required by the output stage, designed along the class D amplifier guidelines. It is provided, however, that both unipolar voltage sources used by the output stage are not DC, but rather two half cycle waveforms, of a higher magnitude than the input voltage. Although this method could in principle be used for a light dimmer, it represents expensive overkill. Its accurate reconstruction of an ideal sinusoidal output waveform virtually independent of the input voltage waveform will impose a relative high manufacturing cost for light dimming applications, where an ideal sinusoidal output waveform is not necessary.

Aside from these sine wave maintaining systems, a relatively newer class of light dimmers uses triacs or silicon controlled rectifiers (SCRs) operating under what is generically called "variable phase angle modulation". In these methods, the triac is turned on at different phases of each half cycle of the sinusoidal wave form. This results in a large current surge through the lamp each time the turn-on event occurs. Since the internal resistance of the lamp varies with the temperature of the lamp or with the light intensity there is an increase in the magnitude of the turn-on current surge due to the fact that at each turn-on point of the triac, the filament is colder than after a number on milliseconds (or fractions of seconds for some higher power lamps) of continuous operation. This high turn-on surge current causes major mechanical and electric noise injected back into the electric network. This is a serious problem at the high current levels that would be present in a lighting system for a theater or an outdoor lighting situation such as at a ball park.

Due to the sharp electromagnetic field variations caused by triacs or SCR's and sharp thermal expansion of the filament at the turn-on point, mechanical noise is generated by the filament. This produces a train of 120 Hz (100 Hz for 50 Hz electric systems) vibrations. The intensity of such vibrations varies with the type and power level of the lamp and with the turn-on moment during each half cycle. Thus these triac systems implemented in large power consuming lighting situations result in annoying acoustic noise and severely detrimental electrical noise feedback into the power supply lines.

As a result these systems have had to go to the expense of providing equipment to attempt to reduce or eliminate both types of noise. For example, a large output inductor has been connected in series with the lamp to limit the di/dt factor by distributing the surge current at the turn-on point over a period of time of several hundreds microseconds. There is a limit to the period of time over which the surge may be smoothed without sacrificing the overall dimmer efficiency. A typical value is that the time period cannot exceed a one millisecond and this value is inversely proportional to the lamp power level. A higher power lamp will require a longer period of time for distributing the turn-on surge current than a low power lamp. The long time period associated with a system tuned for high power lamps will still cause significant amounts of mechanical and electrical noise, specially when a lower power lamp is used.

U.S. Pat. No. 4,633,161 issued to Callahan et al, describes an inductorless phase control dimmer. This patent is directed to the elimination of the filter inductor from the output stage of the dimmer. A pair of MOSFETS is slowly turned on resulting in a low di/dt factor and practically very little mechanical and electric noise. The major disadvantage of this invention is the large amount of power dissipation while both MOSFETS operate in linear mode during their turn on process. The Rds on of the MOSFETS increases with the temperature, further increasing the amount of dissipated power. A large heat sink is needed to properly dissipate the resulting heat. In the case of an output overload or short circuit, the absence of an inductor will cause a sharp output current increase, which may reach fatal levels before the internal current limiting system can react and turn off the MOSFETS.

BRIEF DESCRIPTION OF THE INVENTION

The present invention provides a solid state, high frequency AC switch-mode power controller which avoids the difficulties and disadvantages of prior AC power controllers employed in light dimming applications. Its output waveform is identical, within a reasonable margin of error, with the waveform of the input AC line voltage. The invention comprises an RFI filter interface to the input AC line, which limits the magnitude of switching transients injected back into the AC line.

DETAILED DESCRIPTION OF A PREFERRED EMBODIMENT

A preferred embodiment of the system of the present invention will now be described with reference to the figures.

Figure 1:
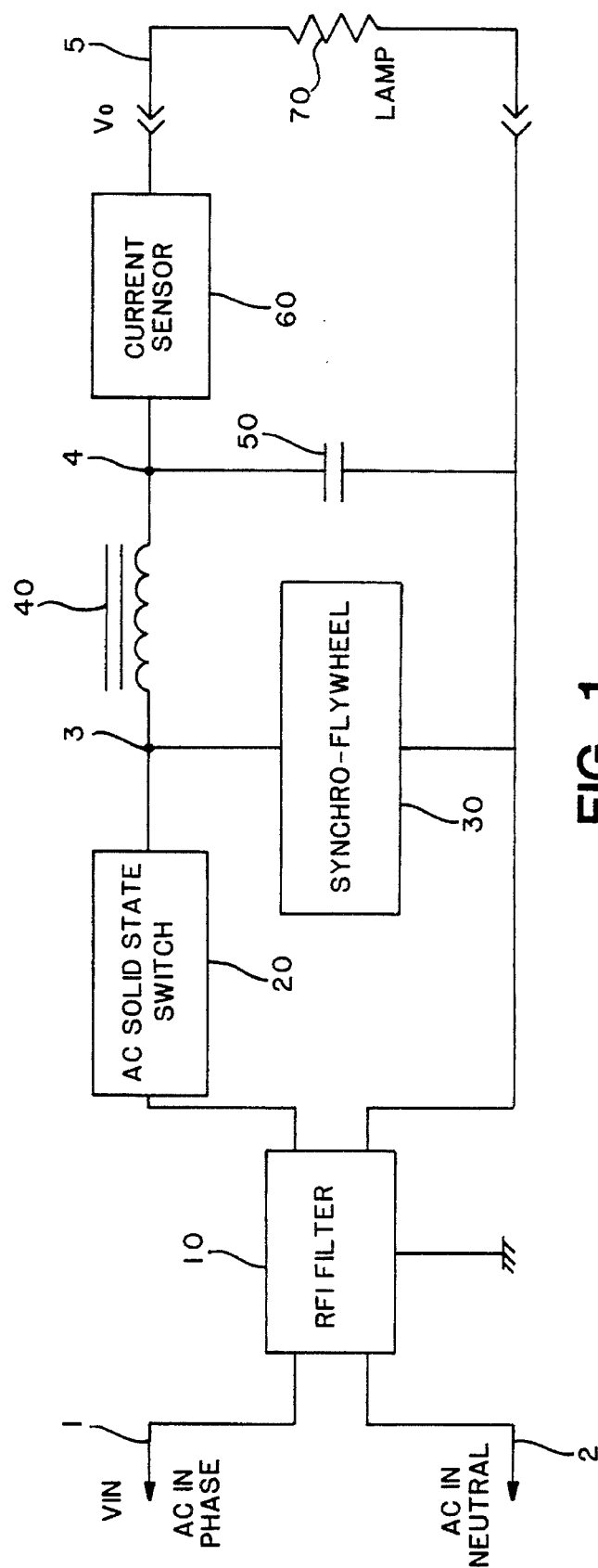
FIG. 1 is a basic simplified block diagram of this invention.

FIG. 1 depicts a basic simplified block diagram of the invention showing its principal elements. An AC solid state switch 20 supplies the load current, with its on/off ratio (duty cycle) set according to the desired output voltage on line 5 and load current requirements. The invention also comprises an output filtering and wave-form re-shaping stage, comprising of an inductor 40 and a filter capacitor 50.

Figure 5:
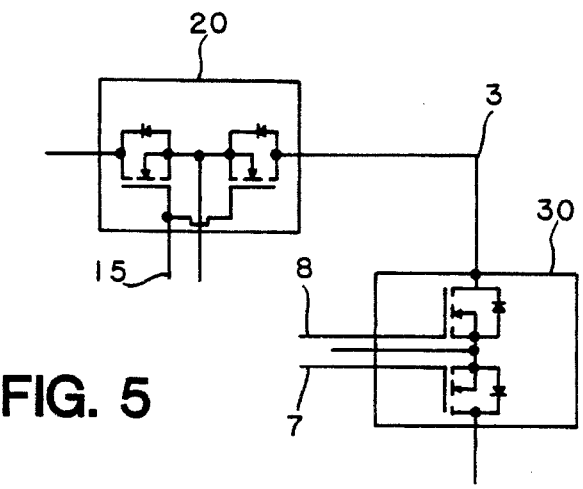
FIG. 5 shows a possible circuit configuration of the AC solid state switch and synchro-flywheel used in the preferred embodiment.

The invention further comprises a synchro-flywheel 30 that allows the discharge of the energy stored in the output inductor. The synchro-flywheel system is reversed biased during the time the AC solid state switch 20 is on and direct biased when the AC solid state switch is off. The inductor 40 discharge current travels through a lamp 60, the synchro-flywheel 30 and the inductor 40. During the inductor discharge portion of the cycle, the output voltage maintains the same polarity as the output voltage encountered during the time the AC solid state switch 20 was on, increasing the overall system efficiency and reducing the output voltage ripple. Thus it may be seen that the purpose of the synchro-flywheel is to discharge the inductor 40 during the time off cycle of the switch 20. As shown in FIG. 5, the synchro-flywheel comprises two common source MOSFETS. Depending upon the polarity of the AC signal a conductive path is established either through the upper diode and lower MOSFET or vice versa.

An output current sensing device 60 turns off and resets the AC solid state switch 20 for a limited period of time, providing a temporary output current on line 5 capable of accommodating lamps with large thermal lags. The current is shut off after the limited period of time has expired, to prevent overloading or short-circuiting.

Figure 2:
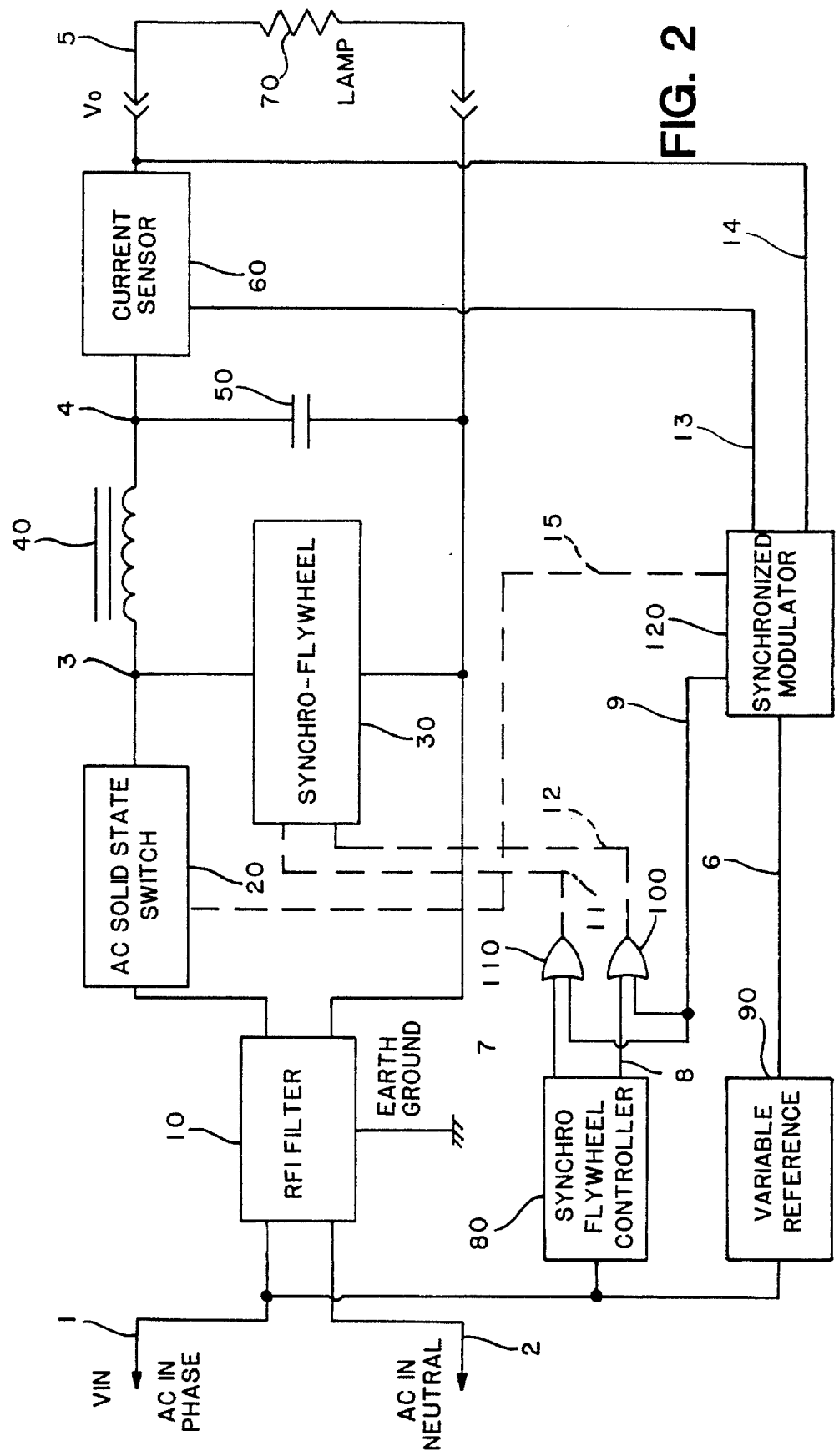
FIG. 2 is a block diagram of a preferred embodiment.

The more detailed depiction of a preferred embodiment is shown in FIG. 2, which has corresponding elements similarly numbered. The description of a preferred embodiment will therefore be carried out with reference to FIG. 2.

FIG. 2 is a functional system block diagram, comprising eleven functional blocks. More particularly, the system comprises an AC power controller having an RFI filter 10 that reduces the magnitude of high frequency switching electric noise and transients injected by the system back into the AC line. A variable reference receives the AC current from the AC line 1 and controls its amplitude on line 6, from zero to a maximum value, corresponding to a zero to 100% output intensity of the lamp 70. The variable reference can be a simple potentiometer, a DC gain controlled operational amplifier or an "n" bit digitally gain-controlled operational amplifier. The number of bits must be selected to allow the desired light control increment.

Figure 3:
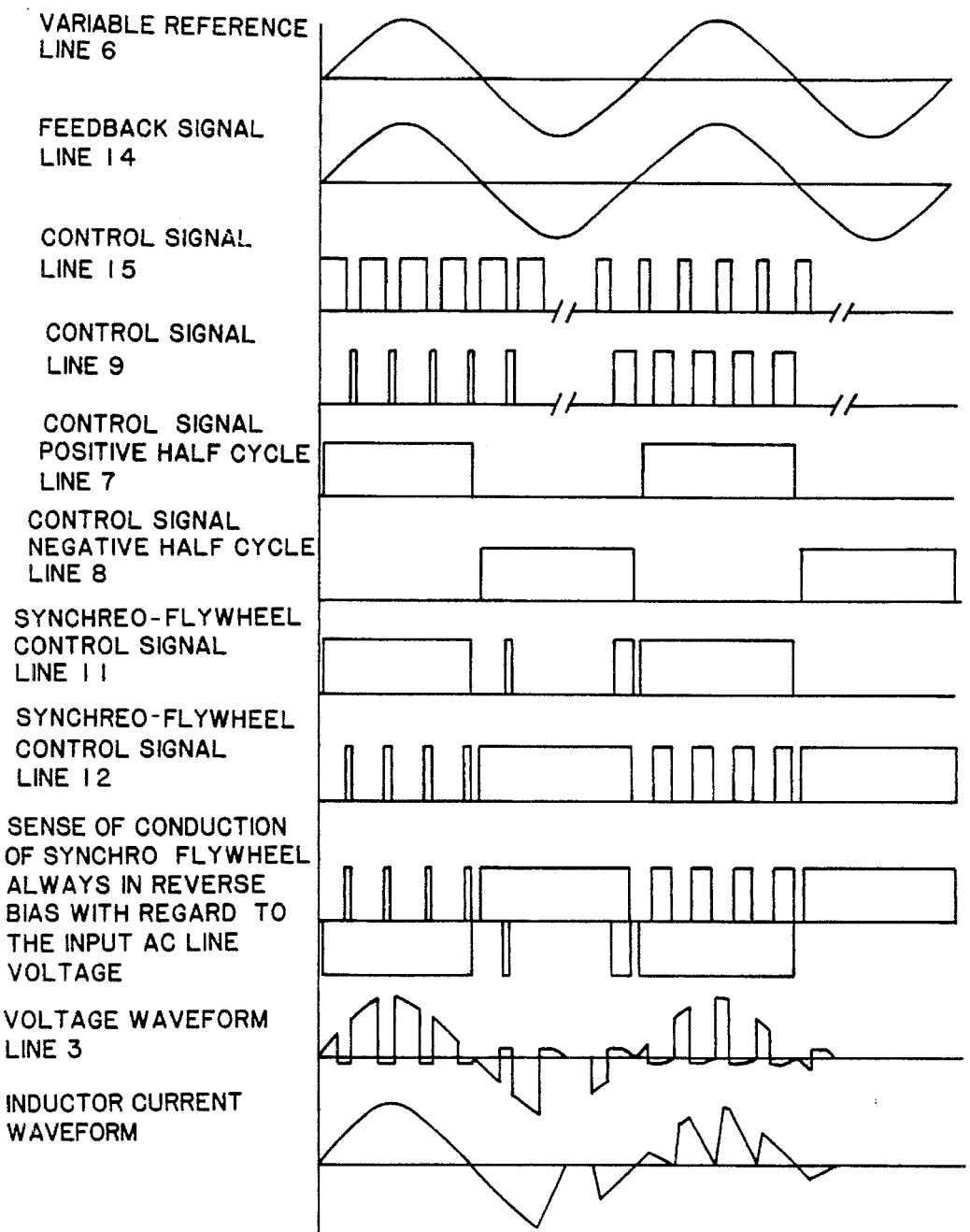
FIG. 3 shows a variety of signals, describing the switch-mode operation of the preferred embodiment.

The synchronized modulator 120 compares the variable reference signal on line 6 and the output voltage signal or feedback signal on line 14, operating in a manner synchronized by the polarity of the AC line voltage and designed for proper operation in all quadrants. If both reference 6 and output voltage signal 14 are positive, both signals are compared by the synchronized modulator 120 with regard to their instantaneous values. As shown in FIG. 3, the duration of the control signal pulses on line 15, as depicted in the left section of the graph, is increased if the output (feedback) voltage signal 14 is lower than the reference signal 6, or decreased, as depicted in the right section of the graph, if the output voltage signal 14 is higher than the reference signal 6. In this case, the resulting internal signal on line 15 controlling the duration of AC solid state switch 20 is a series of control pulses whose width is proportional to the difference between the reference signal 6 and output voltage signal 14. The signals from the synchronized modulator 120 along line 15 will turn on the AC solid state switch 20 when the signals meet the following instantaneous values criteria: $0<Vo<Vin$ and $Vref-Vo>0$, where Vin is the AC line voltage 1, Vo is the output voltage 5 and Vref is the reference signal 6. The synchronized modulator 120 will turn off the AC solid state switch 20 when $0<Vo<Vin$ and $Vref-Vo<0$.

If both reference signal 6 and output voltage signal 14 are negative, both signals are compared by the synchronized modulator 120 with regard to their instantaneous values. The duration of the AC solid state control pulses on line 15 increases if the absolute value of the output voltage signal 14 is lower than the absolute value of the reference signal 6, or decreases if the absolute value of the output voltage signal 14 is higher than the absolute value of the reference signal 6. In this case, the resulting internal signal controlling the duration of AC solid state switch control pulses on line 15 is proportional to the difference between the negative value of the reference signal 6 and the negative value of the output voltage signal 14. The synchronized modulator 120 will turn on the AC solid state switch when the following signals meet the following criteria: $0>Vo>Vin$ and $Vo-Vref>0$. The synchronized modulator 120 will turn off the AC solid state switch and $Vo-Vref<0$.

Figure 6:
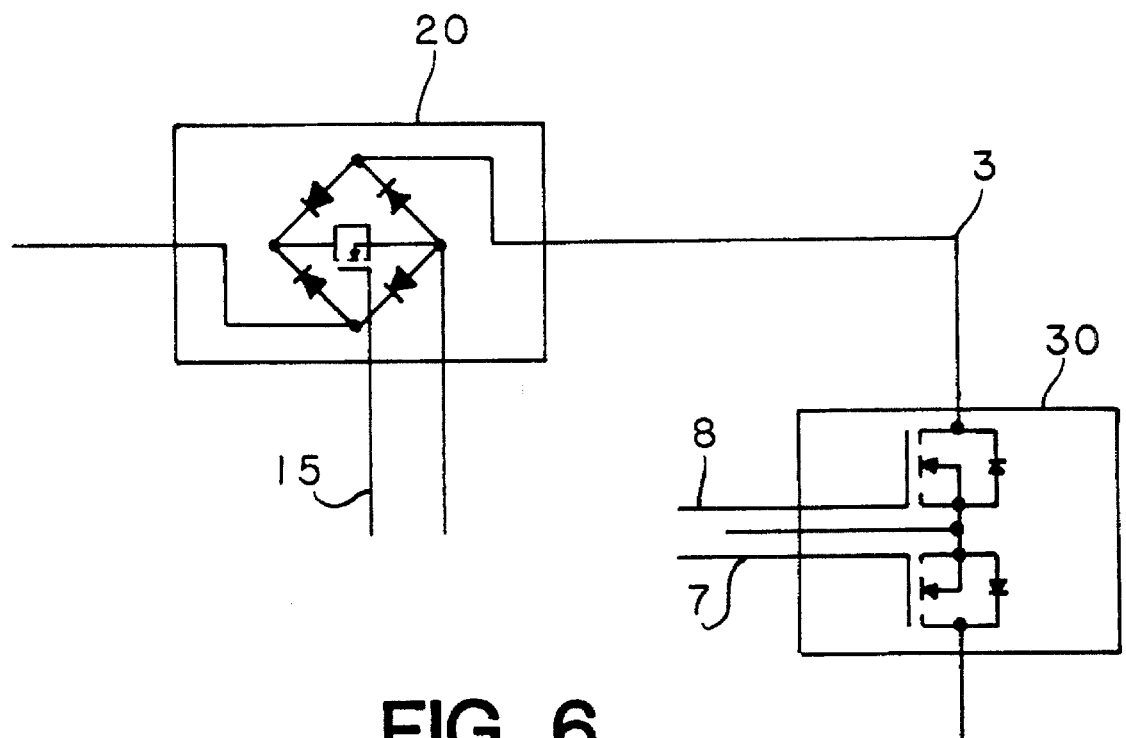
FIG. 6 shows another possible circuit configuration of the AC solid state switch.

For a low power lamp 70 having a relative high internal resistance, it may be necessary to force the discharge of the output filter capacitor 50 in order to maintain a sinusoidal output voltage waveform on line 5, especially in the second and fourth quadrant. The instantaneous polarity of the voltage across the charged capacitor 50 is the same as the instantaneous polarity of the AC line voltage 1. Since the synchro-flywheel 30 is normally reversed biased in this case, the synchronized modulator 120 produces another train of pulses on line 9 when a predetermined value exceeds the output load current measured by the current sensor 60 connected to the synchronized modulator 120 via line 13 is lower than a predetermined value. Each pulse occurs after a short delay time of several hundred nanoseconds and ends several hundred nanoseconds before a new pulse is produced on line 15. This prevents the synchro-flywheel 30 from being direct biased during the time the AC solid state switch 20 is on. This delay would be encountered in preferred embodiments of the solid state switching circuits as shown in FIG. 5 and FIG. 6 and delays introduced by the gate to source and gate to drain capacitance of any power MOSFET.

Inductor 40 must be discharged during the time the AC solid state switch is off. The synchro-flywheel performs this function, by being reversed biased during the time the AC solid state switch is on, and direct biased with regard to the sense of the inductor discharge current when the AC solid state switch is off. A synchro-flywheel controller 80 produces pulses on lines 7 and 8 connected to the "OR" gates 100 and 110, as shown in FIG. 3. Both pulses on lines 7 and 8 are related to the polarity of the AC line voltage 1, as illustrated in FIG. 3. To avoid any overlaps, each pulse starts several microseconds after zero crossing of the AC line voltage 1, and ends several microseconds before zero crossing of the AC line voltage 1. For a high internal resistance lamp 70, pulses generated on line 9 by the synchronized modulator 120 are summed with pulses generated by the synchro-flywheel controller 80 on lines 7 and 8 by the "OR" gates 100 and 110, resulting in signal pulses on lines 11 and 12. Assuming that the AC line voltage 1 is positive, a pulse on line 7 is generated by the synchro-flywheel controller 80. The synchro-flywheel 30 is reversed biased, with respect to the instantaneous polarity of the AC line voltage 1 during the time the AC solid state switch 20 is on and therefore no current will flow through it. When the AC solid state switch 20 is off, the collapse of the voltage on line 3 will cause the inductor 40 to discharge by producing a reversed polarity voltage on line 3. Being direct biased by this reversed voltage on line 3 produced by the inductor 40, the synchro-flywheel 30 allows the inductor 40 discharge current to flow, closing the circuit formed by the inductor 40, lamp 70 and synchro-flywheel 30. The current through the lamp therefore maintains the same polarity as the current produced by turning on the AC solid state switch 20. The process repeats in reverse when the AC line voltage 1 has a negative instantaneous value and a pulse is generated instead by the synchro-flywheel controller on line 8.

Figure 4:
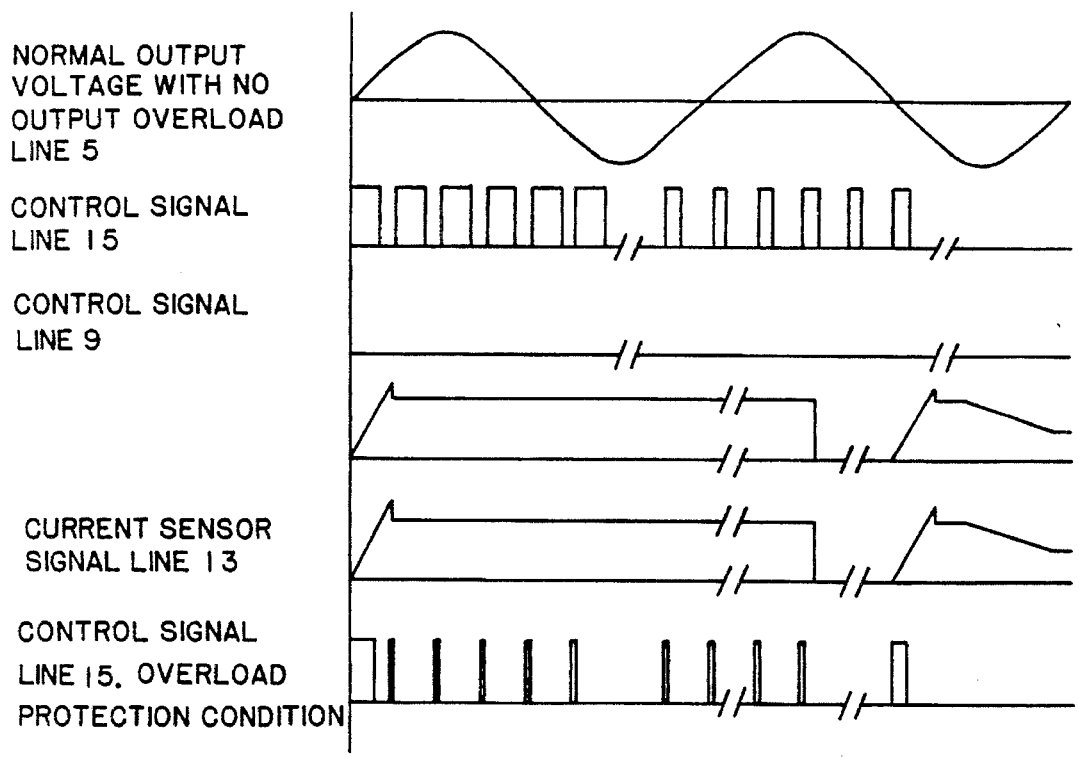
FIG. 4 describes the operation of the output overload and short-circuit protection block and the temporary current limiting process.

The timing signals of the synchro-flywheel 30 for a high internal resistance lamp 70 is shown in FIG. 3. Note that for safety reasons, the synchro-flywheel is direct biased with regard to the instantaneous polarity of the AC line voltage 1 only when the AC solid state switch 20 is off, following the timing rule above described. When the lamp 70 internal resistance is low, the load current is relatively high, and the capacitor 50 may not need to discharge through the synchro-flywheel 30 during the time the AC solid state switch 20 is off, for proper maintenance of a sinusoidal waveform of the output voltage 5. This case is shown in FIG. 4 as an overload condition. No pulses are generated by the synchronized modulator on line 9, therefore the synchro-flywheel is always reversed biased with respect to the instantaneous polarity of the AC line voltage 1, whether the AC solid state switch 20 is on or off.

Referring again to FIG. 3 in which a number of pulses have been artificially removed from various graphs in order to provide the reader with a better understanding of the process, the inductor 40 charge and discharge current waveform is shown. It is generally known that the inductance of a power inductor decreases with the value of the bias DC current through it. In the present invention, the large difference between the switching frequency (period T) and the frequency of the AC line voltage 1, permits treating as DC a half AC cycle of the AC line voltage 1. For an easier graphical representation of the process, all graphs shown in FIG. 3 and FIG. 4 show a relatively small difference between the frequency of the above recited signals. Since the inductance parameter of the inductor 40 decreases with the load current or current through lamp 70, it is necessary to increase the switching frequency or to decrease the amount of time of repetition of pulses on lines 9 and 15, in order to avoid an unwanted resonance condition between inductor 40 and capacitor 50. The initial switching frequency is set at a value higher than the resonance frequency of inductor 40 and capacitor 50, when the inductance parameter of inductor 40 is at its highest value for zero load current. The current sensor 60 supplies the lamp 70 current information to the synchronized modulator 120 which controls the switching frequency of pulses on lines 9 and 15.

Both the AC solid state switch 20 and synchro-flywheel 30 must be protected against output overloads or short-circuits. The current sensor 60 sends its lamp 70 current signal to the synchronized modulator via line 13. A preset reference signal is compared with the signal on line 13. When an output overload or short-circuit is encountered, the amplitude of the output voltage signal 14 is no longer usable as feedback. As shown in FIG. 4, left section of the graph, after a short overshoot, the output current through either a short-circuit or overload, is limited to a safe value by drastically reducing the duration of pulses on line 15. If the load current does not fall below its maximum admissible value after a period of time longer than the thermal lag of a typical high power lamp, a permanent output current shut-off will occur. A system troubleshooting and manual reset will have to be performed in order to restore normal operation of this invention. The right section of the graphs shown in FIG. 4 illustrates the normal output current limiting for compensating for the lamp's thermal lag. When the lamp's filament reaches its nominal "hot resistance" value, the output current limiting process stops, as further shown by the right section of the graphs shown in FIG. 4. All output overload and short-circuit protection and temporary current limiting functions are performed by the synchronized modulator 120.

FIG. 5 and FIG. 6 show two possible topologies for implementing the AC solid state switch 20 and synchro-flywheel 30. Although power MOSFETS were used in the preferred embodiment, power bipolar transistors and parallel diodes can be also used to perform the same functions.

Figure 7:
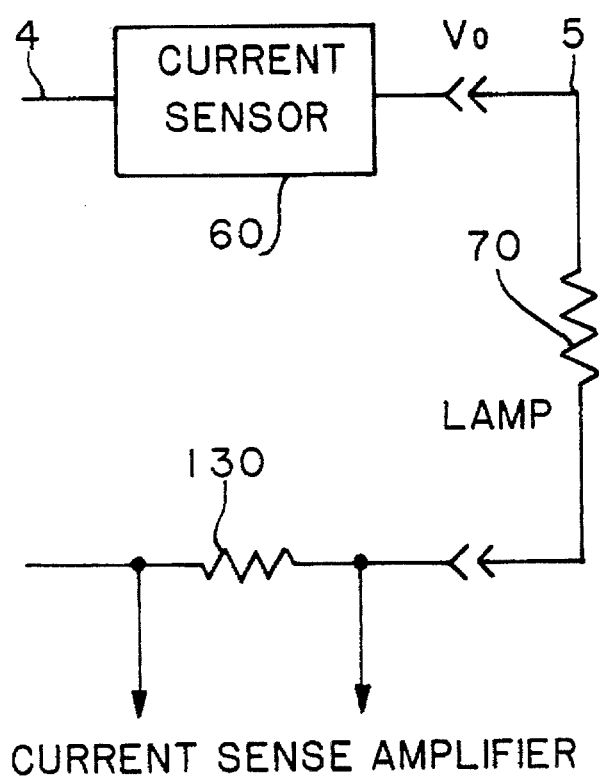
FIG. 7 shows two possible locations of the current sensor, either as used in the preferred embodiment, or as a low value current sense resistor.

FIG. 7 shown two possible configurations and locations for the Current sensor 60, respectively 130. Current sensor 60 used in the preferred embodiment is a wide bandwidth current transformer. A low value in the range of under 20 milliohms current sense resistor 130 coupled to an operational amplifier and to the synchronized modulator 120.

It should be understood that this invention may be reduced to practice be using a large variety of circuit configurations, without departing from the spirit and purpose of this invention.

What is claimed is:

1. A switchmode AC power controller for connection to an AC power line having a neutral terminal for producing and controlling the amplitude of a sinusoidal output voltage, comprising:

an RFI filter connected to said AC power line and said neutral terminal an AC solid state switch having an off cycle and connected between said RFI filter and an output filter inductor to control the amplitude of the output voltage;

a synchro-flywheel connected between the filter inductor and said RFI filter, wherein said inductor is adapted to be charged during the on cycle and discharged through a load connected to receive said output voltage during the off cycle of the AC solid state switch and said output voltage is in phase with said power line.

2. A switchmode AC power controller as recited in claim 1 further comprising a line synchronized modulator means for varying the on/off ratio of said AC solid state switch, operating in closed loop.

3. A switchmode AC power controller as recited in claim 2, further comprising variable reference means for varying the amplitude of said output voltage.

4. A switchmode AC power controller as recited in claim 1, comprising synchro-flywheel controller means for controlling a synchro-flywheel to be reversed biased at all times with respect to the instantaneous polarity of the AC line voltage.

5. A switchmode AC power controller as recited in claim 2, wherein said, AC solid state switch comprises an output filter capacitor, and said synchronized modulator means increases the switching frequency of the AC solid state switch when the output current increases, whereby resonance between the filter inductor and filter capacitor is avoided.

6. A switchmode AC power controller as recited in claim 2, wherein said, AC solid state switch comprises an output filter capacitor, and said synchronized modulator means changes the switching frequency of the AC solid state switch when the output current changes.

7. A switchmode AC power controller for an AC line having a neutral terminal for producing and controlling the amplitude of a sinusoidal output voltage, comprising:

an RFI filter connected to the AC line an output filter having an inductor and capacitor AC solid state switch means connected between the RFI filter and the output filter inductor to control the amplitude of the output voltage, said switch having an off cycle;

an synchro-flywheel means connected between the filter inductor and the neutral of the AC line via the RFI filter for discharging the said inductor during an off cycle of the AC solid state switch;

output current limiting means for limiting the output voltage below a preset value, said current limiting means adapted to vary the on/off ratio of the AC solid state switch;

said current limiting means comprising protection means for turning the output current off if the current limiting persists after a predetermined amount of time, by turning off the AC solid state switch.

8. A switchmode AC power controller as recited in claim 7 comprising temporary current limiting means to limit the output current to a predetermined value during a lamp cold filament start and allowing compensation for the lamp thermal lag.

9. A switchmode AC power controller as recited in claim 7, wherein the AC powerline has a voltage with a sinusoidal wave-form comprising first, second, third and fourth quadrants, and comprising filter capacitor discharge forcing means for discharging said filter capacitor during the second and fourth quadrant at a faster rate when the load resistance is high.

10. A switchmode AC power controller as recited in claim 7, comprising synchronized modulator means for increasing the switching frequency of the AC solid state switch when the output current increases, and for avoiding a resonance condition of the filter inductor and filter capacitor.

11. A switchmode AC power controller as recited in claim 7, comprising variable reference means for use by the synchronized modulator in closed loop operation.

12. A switchmode AC power controller for connection to an AC power line having a neutral terminal for producing and controlling the amplitude of a sinusoidal output voltage, comprising:

an RFI filter connected to said AC power line and said neutral terminal an AC solid state switch having an off cycle and connected between said RFI filter and an output filter inductor to control the amplitude of the output voltage;

a synchro-flywheel connected between the filter inductor and said RFI filter, wherein said inductor is adapted to be discharged during the off cycle of the AC solid state switch, and synchro-flywheel controller means for controlling said synchro-flywheel to be reversed biased at all times with respect to the instantaneous polarity of the AC line voltage.

13. A switchmode AC power controller for connection to an AC power line having a neutral terminal for producing and controlling the amplitude of a sinusoidal output voltage, comprising:

an RFI filter connected to said AC power line and said neutral terminal an AC solid state switch having an off cycle and connected between said RFI filter and an output filter inductor to control the amplitude of the output voltage;

a synchro-flywheel connected between the filter inductor and said RFI filter, wherein said inductor is adapted to be discharged during the off cycle of the AC solid state switch, a synchronized modulator means for varying the on/off ratio of said AC solid state switch, operating in closed loop, wherein said output filter comprises an inductor and capacitor, and said synchronized modulator means increases the switching frequency of the AC solid state switch when the output current increases, whereby resonance between the filter inductor and filter capacitor is avoided, and wherein the AC powerline has a voltage with a sinusoidal wave-form comprising first, second, third and fourth quadrants, and discharge forcing means wherein the filter capacitor is forced to discharge during the second and fourth quadrant at a faster rate by the Synchro-flywheel when the load resistance is high.

* * * * *